(12) United States Patent  (10) Patent No.: US 7,609,518 B2
Hopton et al.  (45) Date of Patent: Oct. 27, 2009

(54) COOLING COMPUTER COMPONENTS

(75) Inventors: Peter John Hopton, Sheffield (GB); Simon Kevin Bown, Sheffield (GB)

(73) Assignee: Iceotope Limited, Sheffield (GB)

( * ) Notice: Subject to any disclaimer, the term of this patent is extended or adjusted under 35 U.S.C. 154(b) by 0 days.

(21) Appl. No.: 11/600,440

(22) Filed: Nov. 16, 2006

(65) Prior Publication Data

US 2007/0109742 A1  May 17, 2007

(51) Int. Cl.
 *H05K 7/20* (2006.01)
(52) U.S. Cl. ............. 361/699; 361/704; 165/80.4; 165/104.33
(58) Field of Classification Search .......... None
See application file for complete search history.

(56) References Cited

U.S. PATENT DOCUMENTS

| | | | | |
|---|---|---|---|---|
| 4,704,658 A * | 11/1987 | Yokouchi et al. | ............ | 361/698 |
| 4,764,845 A * | 8/1988 | Artus | ............ | 361/705 |
| 5,262,921 A * | 11/1993 | Lamers | ............ | 361/699 |
| 5,305,184 A | 4/1994 | Andresen et al. | | |
| 5,349,499 A * | 9/1994 | Yamada et al. | ............ | 361/700 |
| 5,373,417 A * | 12/1994 | Barrett | ............ | 361/699 |
| 5,569,950 A * | 10/1996 | Lewis et al. | ............ | 257/467 |
| 6,123,145 A * | 9/2000 | Glezer et al. | ............ | 165/104.33 |
| 6,173,577 B1 | 1/2001 | Gold | | |
| 6,175,501 B1 * | 1/2001 | Bortolini et al. | ............ | 361/720 |
| 6,193,905 B1 * | 2/2001 | Yamada et al. | ............ | 252/67 |
| 6,992,888 B1 * | 1/2006 | Iyer | ............ | 361/699 |
| 7,092,254 B1 * | 8/2006 | Monsef et al. | ............ | 361/699 |
| 7,161,804 B2 * | 1/2007 | Oyamada | ............ | 361/703 |
| 7,187,265 B1 * | 3/2007 | Senogles et al. | ............ | 340/3.5 |
| 7,200,008 B1 * | 4/2007 | Bhugra | ............ | 361/724 |
| 7,211,742 B2 * | 5/2007 | Moore et al. | ............ | 174/539 |
| 7,257,003 B2 * | 8/2007 | Ono | ............ | 361/704 |
| 7,277,282 B2 * | 10/2007 | Tate | ............ | 361/697 |
| 7,307,841 B2 * | 12/2007 | Berlin et al. | ............ | 361/699 |

FOREIGN PATENT DOCUMENTS

| | | |
|---|---|---|
| DE | 20 2005 002390 | 7/2005 |
| EP | 0369827 | 5/1990 |
| EP | 0524757 | 1/1993 |
| GB | 888944 | 2/1962 |
| GB | 1064907 | 4/1967 |
| GB | 1126180 | 9/1968 |
| GB | 1431560 | 4/1976 |
| GB | 2235334 | 2/1991 |
| JP | 9/293813 | 11/1997 |
| WO | WO 2006/133429 | 12/2006 |

\* cited by examiner

*Primary Examiner*—Boris L Chervinsky
(74) *Attorney, Agent, or Firm*—James Creighton Wray; Meera P. Narasimhan

(57) ABSTRACT

A tank and a lid are configured to mate to provide a substantially airtight container for containing a processing board for a computer and a liquid. A cooling system is configured to cool the interior of the container, and a serial data connection is provided between the processing board and the exterior of the container.

18 Claims, 16 Drawing Sheets

COOLING COMPUTER COMPONENTS

CROSS REFERENCE TO RELATED APPLICATIONS

This application claims the benefit of GB Application No. 05 23 383.8 filed Nov. 17, 2005, which is hereby incorporated by reference in its entirety.

This application claims priority from United Kingdom patent application number 0523383.8 filed 17 Nov. 2005, the entire disclosure of which is incorporated herein in its entirety.

BACKGROUND OF THE INVENTION

The present invention relates to computer apparatus, and particularly to cooling components of computers in order to improve efficiency and speed.

Computers fulfill a variety of tasks in the modern world. Desktop PCs are used for recreation at home and are essential to most offices, and laptop or notebook computers provide the additional benefit of portability. Individually-designed computers control industrial processes, while networked server farms are efficiently controlled to allow maximum processing power to applications processing large amounts of information.

All electronic components produce heat, and in general the faster they process information, the more heat they produce. Thus computer speed and efficiency are limited by how much heat can be removed from components. A typical PC has a fan and heatsink on the CPU to keep it cool. A case fan blows air through the case and a fan in the power supply keeps the power supply from overheating. A computer with such a system can be kept at a temperature a little above room temperature.

Water-cooled systems are used in laptop and notebook computers, in which the problem of heat is exacerbated by the components' close proximity to one another. In such a system water is piped over the components, cooled in a radiator and returned. Again, this system keeps the computer at around room temperature.

Using a coolant with a lower freezing point than water in such a system could lower the temperature dramatically. However, cooling components below room temperature would cause moisture in the air to condense onto them, causing damage.

BRIEF SUMMARY OF THE INVENTION

According to an aspect of the invention, there is provided, in a computer system in which a central processing unit generates heat while in operation, said processing device is mounted on a motherboard and said processing unit communicates with a storage device, apparatus for cooling said motherboard, comprising: a substantially airtight container configured to enclose said motherboard; a liquid contained within said container and surrounding said motherboard such that said motherboard is immersed in said liquid so as to remove heat from said processing unit; a cooling system configured to cool the interior of the container; and a serial data connection extending from said container to provide serial communication between said processing device and said storage device.

WRITTEN DESCRIPTION OF THE BEST MODE FOR CARRYING OUT THE INVENTION

Figure 1:
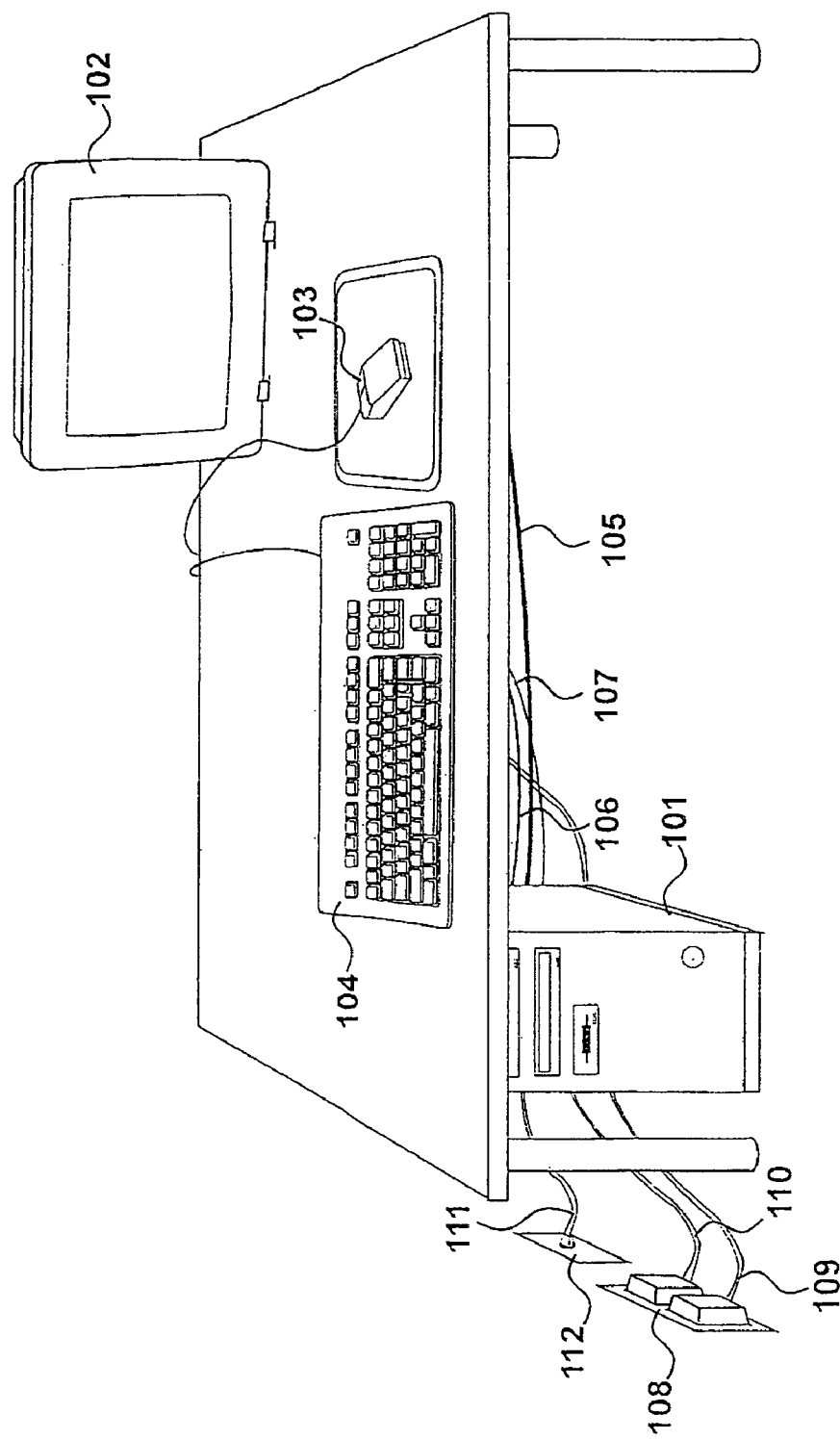
FIG. 1 illustrates a computer system.

A personal computer system is shown in FIG. 1. It comprises a computer 101, and a monitor 102, a mouse 103 and a keyboard 104, each of which is connected to computer 101 by cables 105, 106 and 107 respectively. Computer 101 and monitor 102 each draw power from power socket 108 via power cables 109 and 110 respectively, and computer 101 is connected to a network using cable 110 and network socket 111.

Using this system, a user can perform various tasks dependent upon the type of applications with which computer 101 is equipped. Such applications could be a game, a word-processing application, a desktop publishing application, an Internet browser, a graphics package, and so on.

Figure 2:
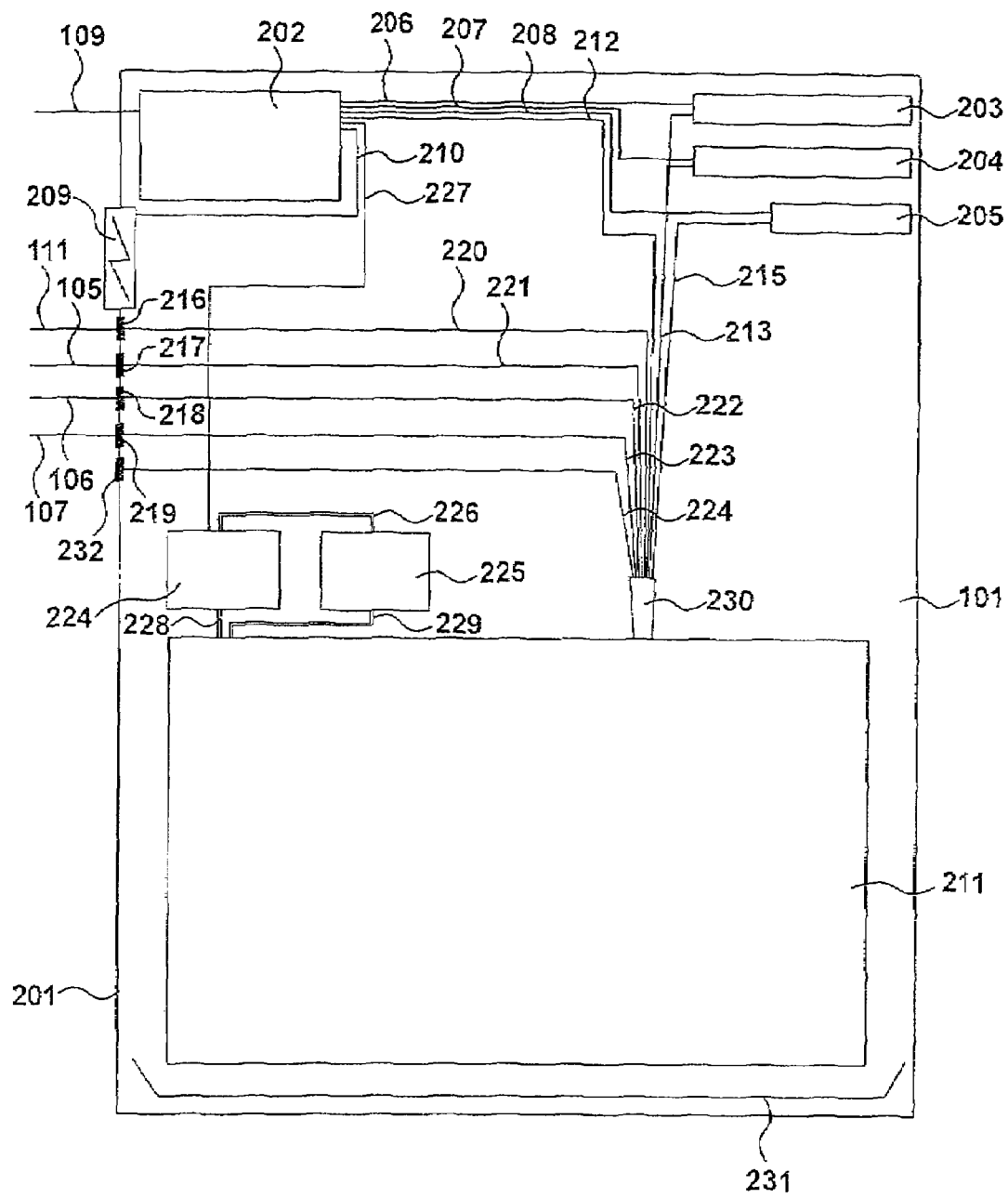
FIG. 2 shows a diagram of the computer used in the computer system shown in FIG. 1.

A diagram of computer 101 is shown in FIG. 2. It comprises a case 201 within which are mounted a power supply 202, a hard drive 203, a CD ROM drive 204 and a floppy drive 205. Power supply 202 receives power via cable 109 and supplies it to each of the drives 203 to 205 via cables 206, 207 and 208 respectively.

Within an aperture in case 201 is a fan 209, which receives power from power supply 202 via cable 210, which sucks air into computer 101 in order to cool components 202 to 205.

Computer 101 also includes motherboard unit 211. Motherboard unit 211 comprises a motherboard and other components of computer 101 and is cooled below room temperature, and preferably below 0° C., in order to allow the cooled components to function more efficiently. Motherboard unit 211 receives power from power supply 202 via cable 212. It provides output to and receives input from hard drive 203 and CD ROM drive 204 via SATA cable 213. It provides output to and receives input from floppy disk drive 205 via low bandwidth IDE cable 215. Computer 101 is provided with connections 216, 217, 218 and 219 into which cables 110 (to network point 111), 105 (to monitor 102), 106 (to mouse 103), 107 (to keyboard 104), and USB ports 232. Motherboard unit 211 is connected to connections 216 to 219 and 232 by cables 220, 221, 222, 223 and 215 respectively. The cables 212, 213, 214, 215, 220, 221, 222 and 223 are encased in a shrink-wrapped plastic sheath 230 at the point where they enter motherboard unit 211.

Computer 101 further includes a pump 224 and a condenser 225 which are connected to the motherboard unit by pipe 226. Pump 224 receives power from power supply 202 via cable 227. Pipe 228 carries coolant from motherboard unit 211 to pump 224, while pipe 229 carries the coolant from condenser 225 into motherboard unit 211.

Computer 101 further includes a drip tray 231 designed to collect any condensation which may form within computer 101.

Figure 3:
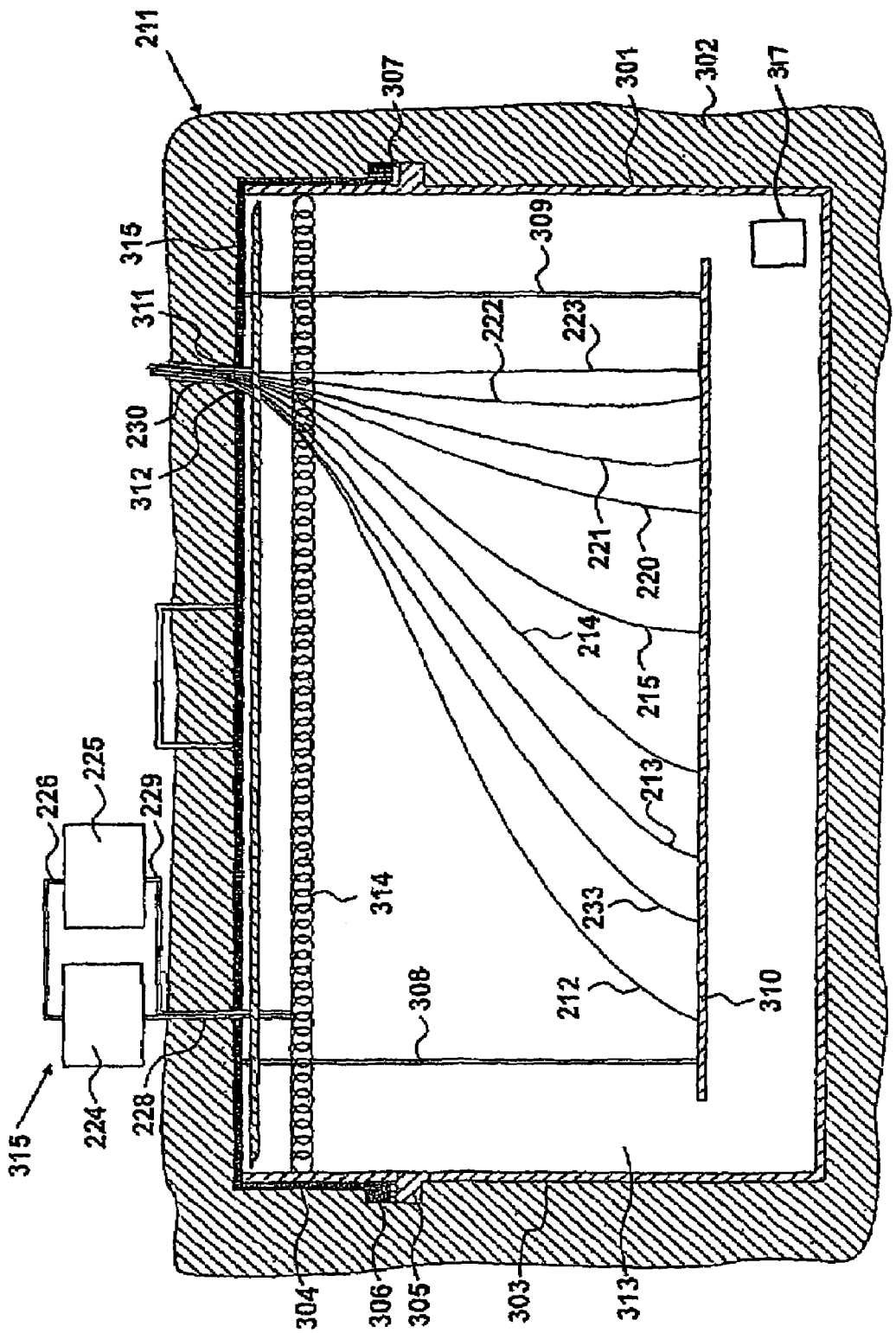
FIG. 3 shows a diagram of a motherboard unit shown in FIG. 2.

A diagram of motherboard unit 211 is shown in FIG. 3. Unit 211 includes a container 301 encased in insulating foam 302. Container 301 is comprised of tank 303 and lid 304. Tank 303 is provided with a lip 305, and lid 304 is provided with a corresponding lip 306. Each lip is provided with a seal made of rubber or other suitable material in order that when tank 303 and lid 304 are mated they can be fastened together to provide a substantially airtight seal 307. It will be appreciated that other methods of providing a substantially airtight container are possible.

Four rods hang vertically from lid 304, of which rods 308 and 309 are shown in FIG. 3. The rods are connected to motherboard 310 such that motherboard 310 is suspended within container 301. Any number of rods or an alternative method of suspending the motherboard could be used. Cables 212 to 215 and 220 to 223, encased within plastic sheath 230, pass through an aperture 311 in the top of lid 304. Aperture 311 is sealed using sealant 312. Each of the cables 212 to 215 and 220 to 223 is connected to its appropriate place on motherboard 310, preferably using soldering. Thus an electrical connection is provided between the interior and the exterior of motherboard unit 211.

Container 301 is substantially filled with oil 313. In this embodiment it is 4-stroke engine oil, although in other embodiments other oils such as silicone oil, synthetic oil, transformer oil or recycled synthetic oil could be used. Oil 313 can be cooled to approximately −30° C., although other oils can be cooled to different temperatures.

Suspended within lid 304 is evaporator coil 314. Cooling system 315 is made up from pump 224, condenser 225, pipes 226, 228 and 229, and evaporator coil 314. Coolant, which in this example is air-conditioning coolant but could be any suitable fluid, is pumped around cooling system 315 by pump 224 to cool oil 313, preferably to as low a temperature as possible without degrading oil 313. Pipes 228 and 229 enter container 301 through a sealed hole 316 in lid 304. Other embodiments in which the pump and condenser are within the container 301 are possible, but in this embodiment it is more efficient for them to be outside the container.

As shown in FIG. 3, motherboard 310 is near to the bottom of container 301, while evaporator coil 314 is near the top of container 301. This arrangement ensures that convection currents are produced within oil 313. Oil is warmed by motherboard 310 and rises to the top of container 301, where it is cooled by evaporator coil 314 before falling to the bottom of container 301. In other embodiments, motherboard 310 and evaporator coil 314 could be arranged differently, but if the arrangement does not produce convection with oil 313 then an agitator 317 or similar would be required. Preferably, there is provided a gap between motherboard 310 and the base of the container 301, in case of water entering the container and sinking below the oil.

Thus there is provided apparatus for cooling a motherboard 310, comprising a tank 303 and a lid 304 configured to mate to provide a substantially airtight container 301 for containing the motherboard, a cooling system 315 configured to cool the interior of the container, and an electrical connection such as cable 213 between the motherboard and the exterior of the container.

Desiccant material 315 is fixed to the underside of lid 304. In this embodiment, material 315 is a silica gel. Desiccant material 315 ensures that any air within container 301 is dried out, which is necessary because water degrades oil 313 and could damage the components on motherboard 310.

Insulation 302 is in this embodiment standard housing insulation such as polystyrene foam. Insulation 302 ensures that the outside of motherboard unit 211 is at substantially the same temperature as the air within computer 101. This allows efficient cooling of oil 313 and also avoids condensation forming on the outside of motherboard unit 211.

Figure 4:
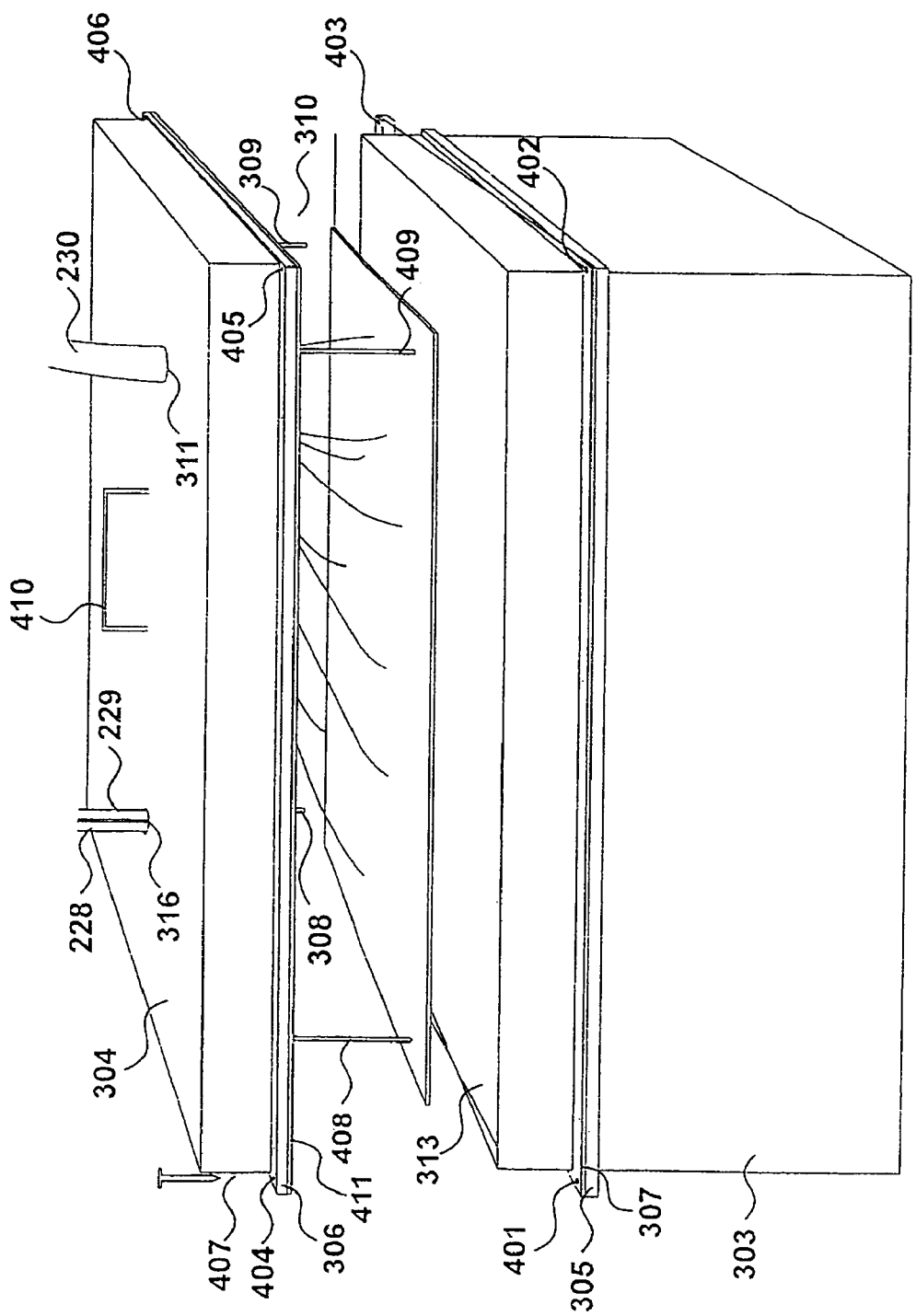
FIG. 4 illustrates the motherboard unit shown in FIG. 3.

Container 301 is shown opened in FIG. 4. Tank 303 is shown filled nearly to the top with oil 313. Lip 305 is provided with rubber seal 307 and with screw holes, such as holes 401, 402 and 403. Lid 304 is provided with lip 306, which has screw holes such as screw holes 404, 405 and 406, and rubber seal 411. When lid 304 and tank 303 are mated together they are fastened by means of screws. For example, screw 407 passes through screw hole 404 and screw hole 401. When the screws are tightened down an airtight seal is created. At this stage any air trapped inside container 301 is dried out by desiccant material 315.

Motherboard 310 is suspended from lid 304 by means of rods 308, 309, 408 and 409. Plastic sheath 230 containing the cables passes through hole 311 in lid 304, while the pipes 228 and 229 of cooling system 315 pass through hole 316 in lid 304. Both holes are sealed using, for example, electrical sealant. Evaporator coil 314 and desiccant material 315 are within lid 304 and cannot be seen. Lid 304 is also provided with a handle 410.

It can be seen from FIG. 4 that this arrangement allows motherboard 310 to be easily placed into and lifted out of tank 303. However, other arrangements of motherboard unit 211 are contemplated.

Figure 5:
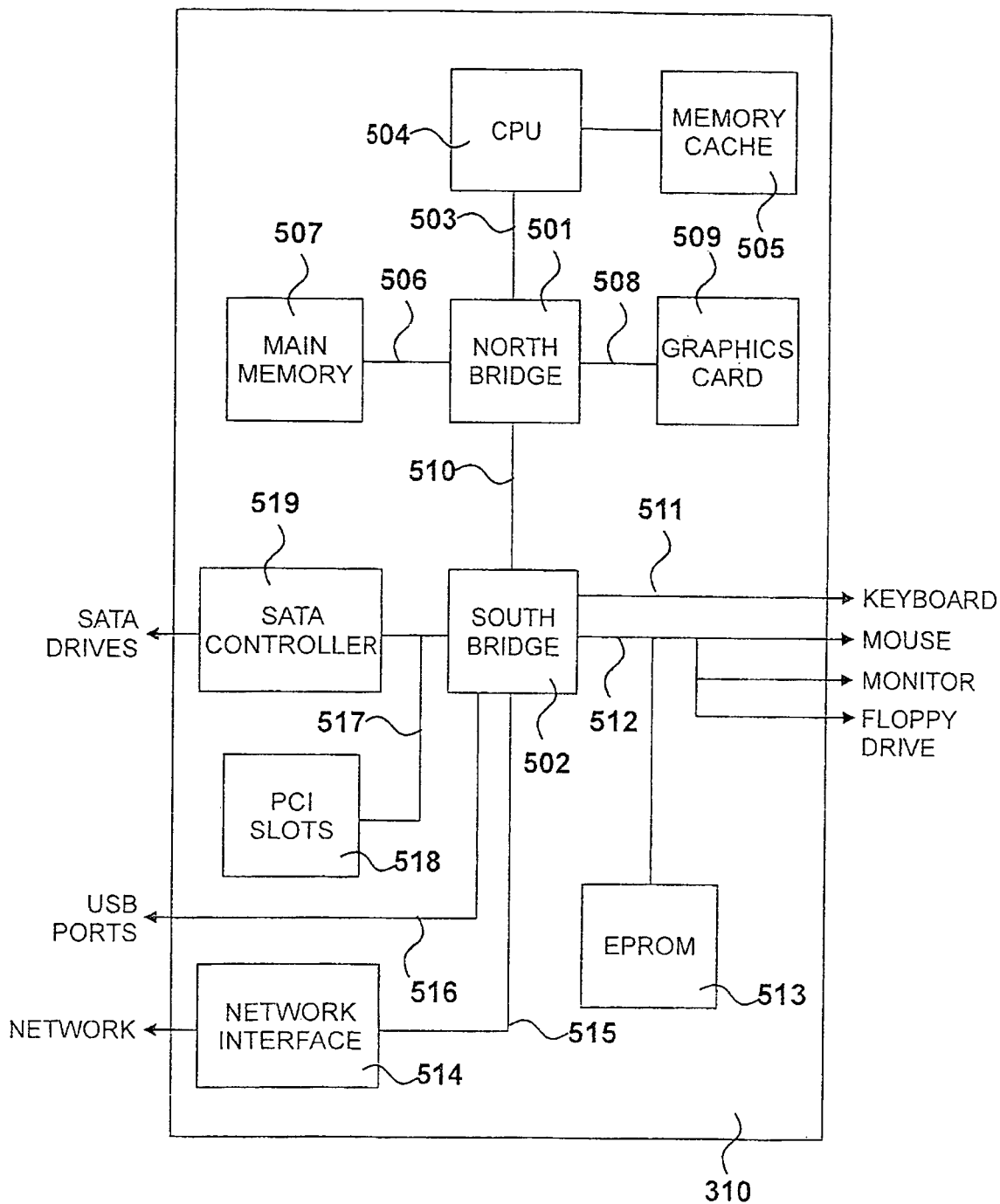
FIG. 5 shows a diagram of the motherboard in the motherboard unit shown in FIG. 3.

FIG. 5 shows a block diagram of motherboard 310. In this embodiment, the motherboard is a Mercury KT600 using a VIA chip set. The chip set includes two microchips called the North Bridge 501 and the South Bridge 502. North Bridge 501 is connected via a front side bus 503 to a CPU socket, in which CPU 504 is placed. In this embodiment the CPU is an AMD Sempron 2800 which includes a memory cache 505. Double Data Rate bus 506 connects North Bridge 501 with a RAM socket into which memory 507 is placed. AGP bus 508 connects north bridge 501 to a graphics card socket, in which graphics card 509 is placed. In this example the graphics card is an ATI Radeon 9200SE.

South Bridge Interface 510 connects North Bridge 501 and South Bridge 502. South bridge 502 is responsible for managing peripherals in computer 101. Keyboard channel 511 is used to control keyboard 104 and is connected to cable 223. LPC bus 512 provides communication between South Bridge 502 and mouse 103, monitor 102 and floppy disk drive 205. Thus it provides connections to cables 222, 221 and 215. Also connected to LPC bus 512 is EPROM 513 which contains the computer's BIOS, used to boot up computer 101 when it is switched on.

South Bridge 502 is connected to a network interface card 514 using a fast Ethernet connection 515. Network interface 514 is connected to cable 220. A Universal Serial Bus 516 is connected to cable 215. In this embodiment the USB ports provided by computer 101 are not used, but in another embodiment they could be used to connect a variety of peripherals, such as a keyboard, a mouse, a printer, a digital music player, and so on. In the embodiment described with respect to FIG. 10, USB is used to attach motherboard unit 211 to IDE drives.

PCI bus 517 connects South Bridge 202 with PCI slots 518 and SATA controller 519. SATA controller 519 is connected to SATA cable 213, which is in turn connected to hard drive 203 and CD-ROM drive 204.

None of the connections to or from motherboard 310 uses high bandwidth parallel communication. A parallel cable transfers data more than one bit at a time. Thus, for example, an IDE cable (also known as ATA or parallel ATA) transfers data either sixteen of thirty-two bits at a time. Conversely, a serial cable transfers bits one after another. When a high bandwidth parallel cable is immersed in oil the electrolytic properties of the oil cause interference between the channels of the cable. Thus such cables cannot be used within motherboard unit 211. Floppy drive cable 215 is a parallel cable, but it is low bandwidth and thus is not affected by the oil. However, connections to hard drives and CD-ROM or DVD drives are high bandwidth and therefore the conventional parallel cables cannot be used. Thus cable 213 is a SATA (serial ATA) cable which is not affected by oil 313. USB cable 215 is also a method of serial connection and so this can be used.

Thus computer 101 includes a motherboard 310 and a drive 203. The motherboard is immersed in a cooled fluid 313 and the motherboard is connected to the drive using a serial cable 213.

Dependent upon the type of motherboard used, it may be necessary to adapt motherboard 310 slightly to enable it to be used within oil 313. Examples of such adaptations include soldering connections down, re-routing connections to avoid interference, and replacing components such as capacitors with ones more suitable for immersion in oil.

Figure 6:
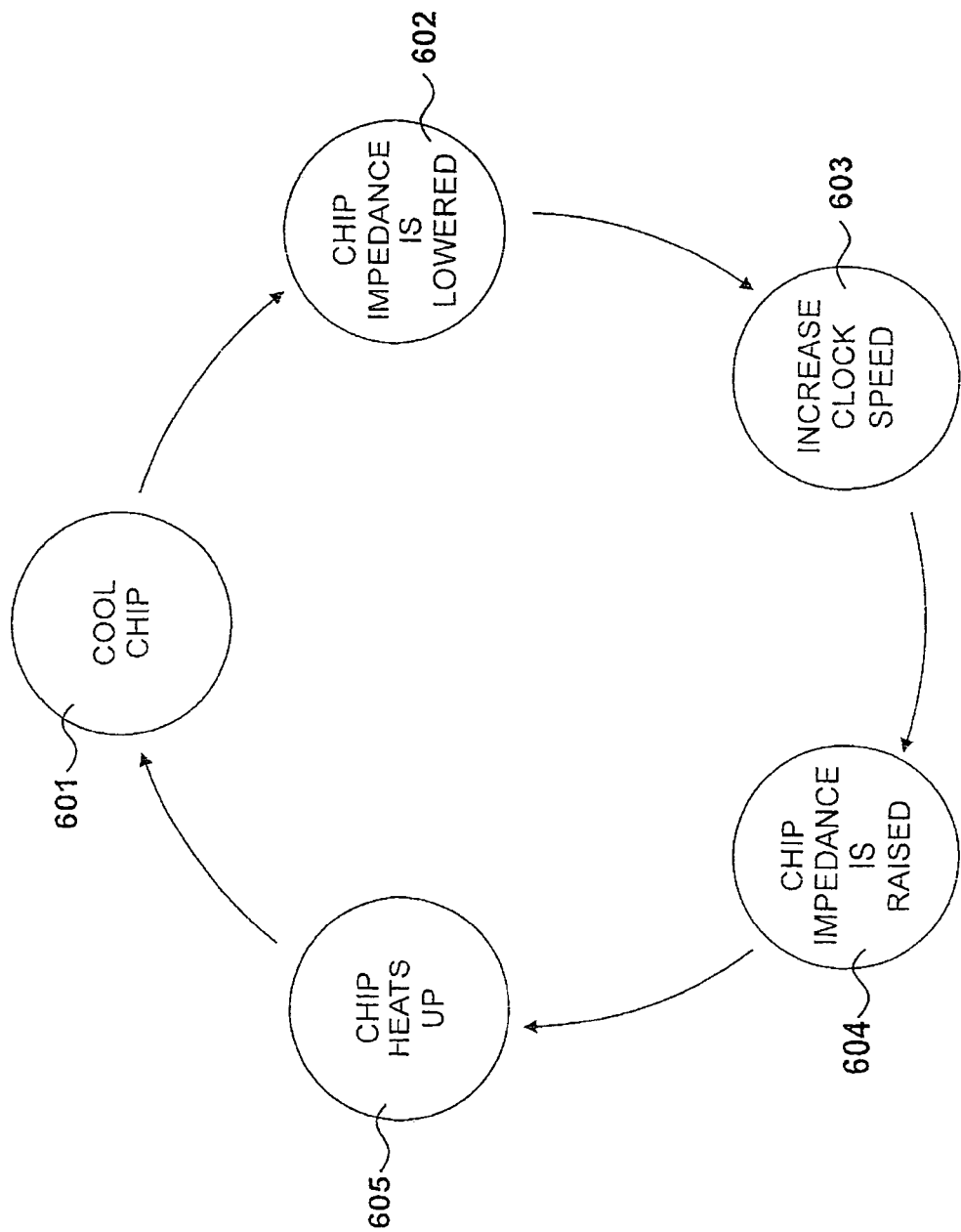
FIG. 6 illustrates the process of overclocking.

FIG. 6 is a diagram showing how cooling of computer components can lead to them functioning more efficiently. At step 601 a chip is cooled down. This chip could be, for example, the CPU core, the graphics card core, the RAM, the North Bridge, the South Bridge, and so on. At step 602 this cooling leads to a reduction in the impedance of the chip. This means that at step 603 the clock speed of the chip can be increased. This increase in the speed of oscillation of the signal is known as overclocking, and it has the result that at step 604 the chip's impedance is raised. In turn, this leads to the chip heating up at step 605, whereupon the process returns to step 601 and the chip is cooled. This cycle is constantly repeated, and results in the chip settling down to a steady clock speed. It can be performed manually, but many chips include a process that automatically adjusts the clock speed according to the temperature of the chip.

An overclocked chip can perform more instructions per second, which in turn leads to a faster computer. For example, if the motherboard and its components are cooled to −40° C. this can lead to a seventy percent increase in speed.

Figure 7:
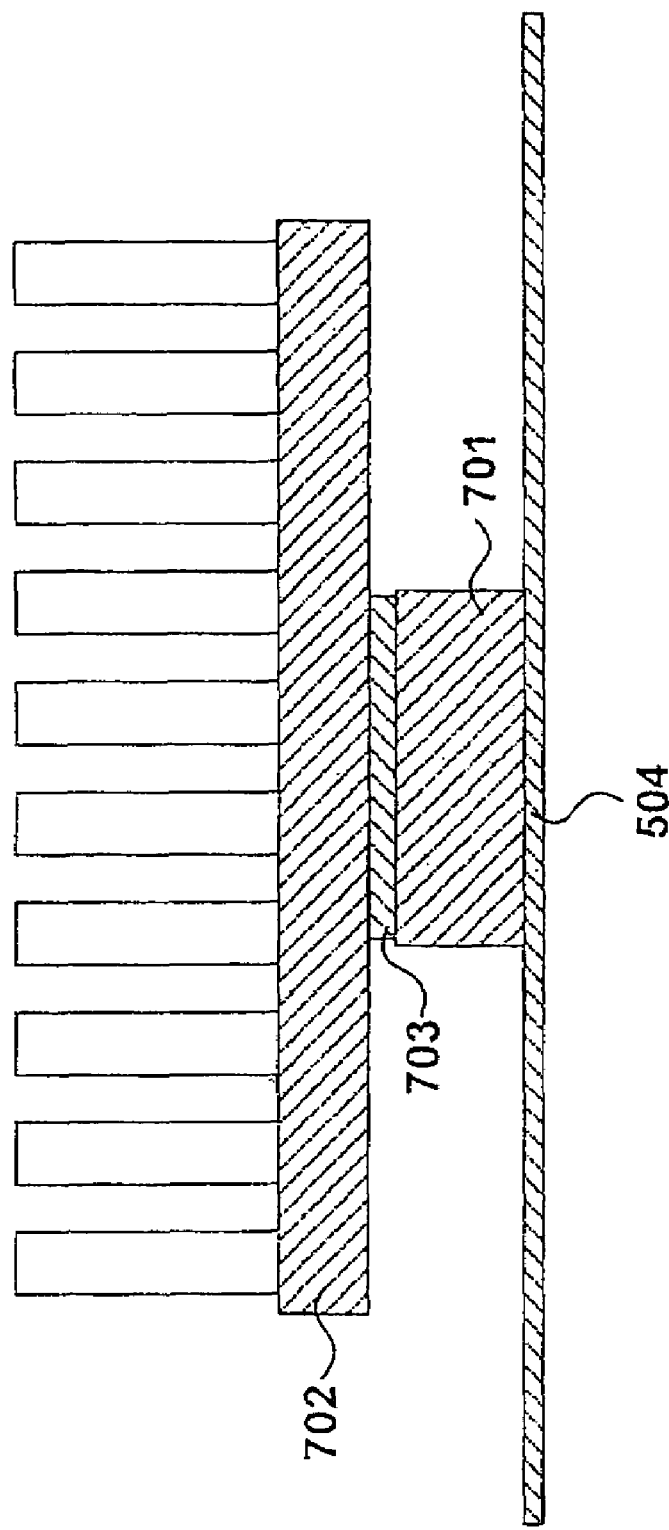
FIG. 7 shows a heatsink on a chip on the motherboard shown in FIG. 4.

In order to cool the motherboard components down more efficiently, heat sinks are preferably used, as shown in FIG. 7. A chip that is in contact with the cooled oil 313 will not cool down by very much, regardless of the temperature of the oil, because it produces a lot of heat and does not have a large surface area. Thus the core 701 of CPU 504 is shown with a heat sink 702 on top of it. A thin layer 703 of silver thermal compound ensures even heat conduction between the core 701 and the heat sink 702. Heat sink 702 is manufactured from copper, but could be manufactured from any material having a high thermal value, such as silver or diamond.

Core 701 produces heat which is conducted via silver compound 703 to heat sink 702. Heat sink 702 presents a large surface area to oil 313 and therefore cools down quickly. Thus heat sink 702 carries heat away from core 701, allowing it to cool down, preferably below 0° C., and be overclocked.

Figure 8:
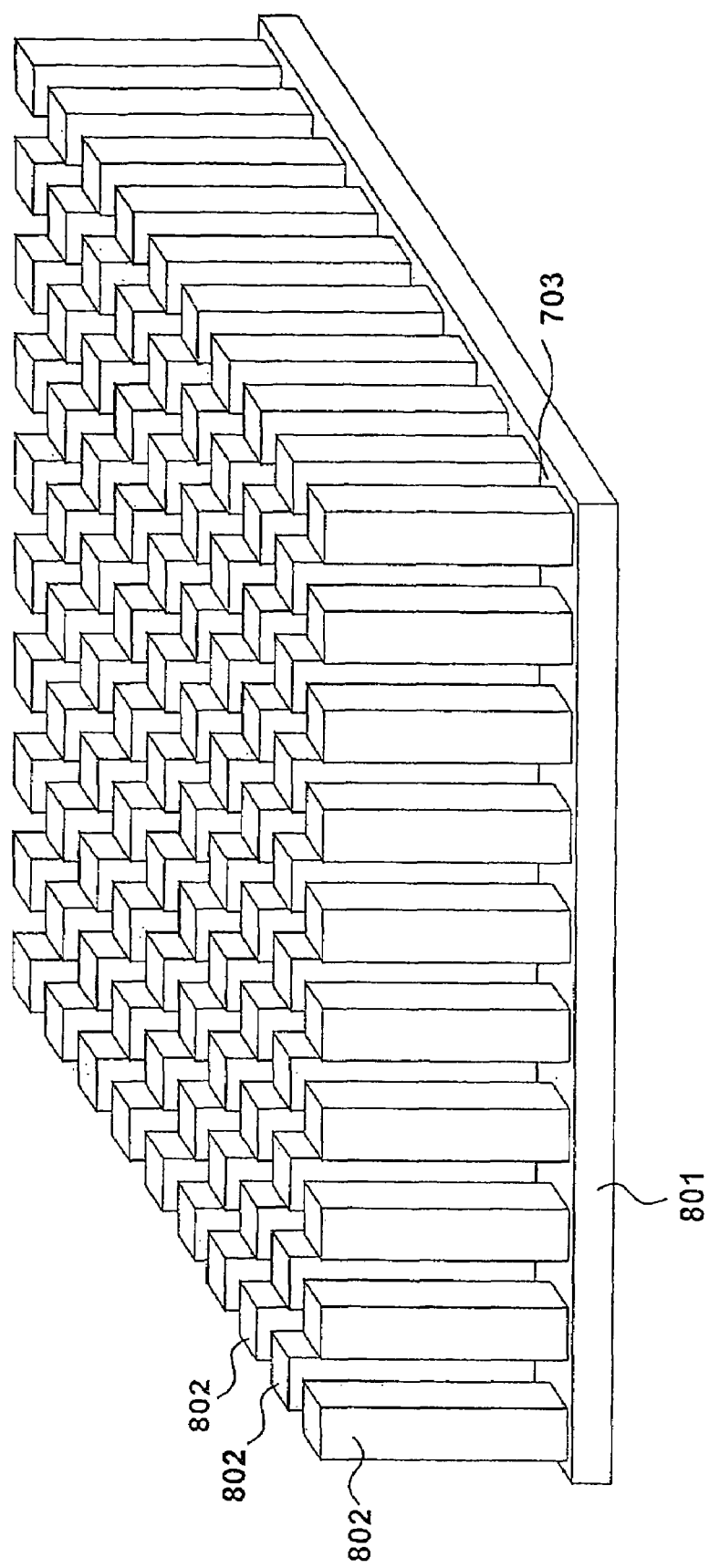
FIG. 8 illustrates the heatsink shown in FIG. 7.

FIG. 8 illustrates the heat sink 702 shown in FIG. 7. It comprises a base 801 and a plurality of fins 802. The fins should be of a size, number and position such that the surface area of the heat sink is maximised without the gaps between the fins 802 being so small that the oil does not pass easily between them. As described with reference to FIG. 3, movement in the oil 313 is achieved either by convection currents or by use of an agitator or similar.

Figure 9:
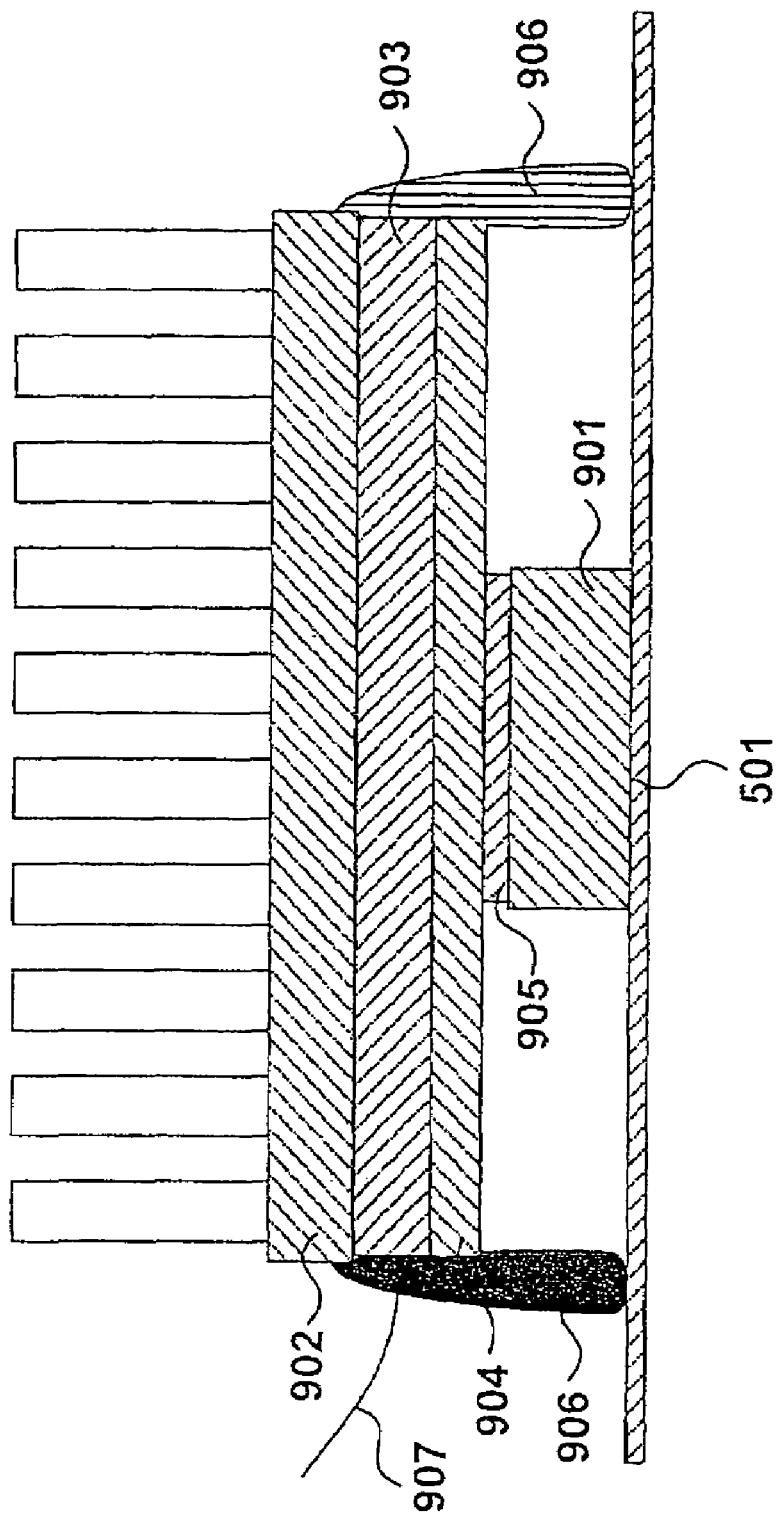
FIG. 9 shows an arrangement including a peltier element on a chip on the motherboard shown in FIG. 4.

FIG. 9 shows an alternative way of cooling a chip. In this example the core 901 of the North Bridge microchip 501 is cooled using a heat sink 902, similar to heat sink 702, placed upon a peltier element 903, placed upon a copper plate 904. Efficient conduction between core 901 and copper plate 904 is ensured using silver thermal compound 905. High grade electrical sealant 906 is preferably used around the core 901, copper plate 904, and peltier element 903, so that the oil 313 does not come into contact with peltier element 903. An electrical charge is provided to peltier element 903 via power cable 907.

A peltier element is an electronic heat pump comprising a large number of thermocouples arranged in a rectangular form and packaged between two thin ceramic plates. When a voltage is applied across the thermocouples heat is moved from one side to the other side.

Thus in the diagram shown in FIG. 9, heat is generated by core 901 and is conducted to copper plates 904. This in turn heats up the lower side of peltier element 903, which, when energised via cable 907, transfers the heat to its upper side, where it is cooled by heat sink 902. A peltier element typically allows a difference of about 60° C. between its upper and lower sides, which means that if the oil 313 has a temperature of −30° C., core 901 can be kept considerably cooler than that. Sealant 906 is used in order to isolate core 901 from oil 313, since it could degrade at the low temperature under the peltier element.

Figure 10:
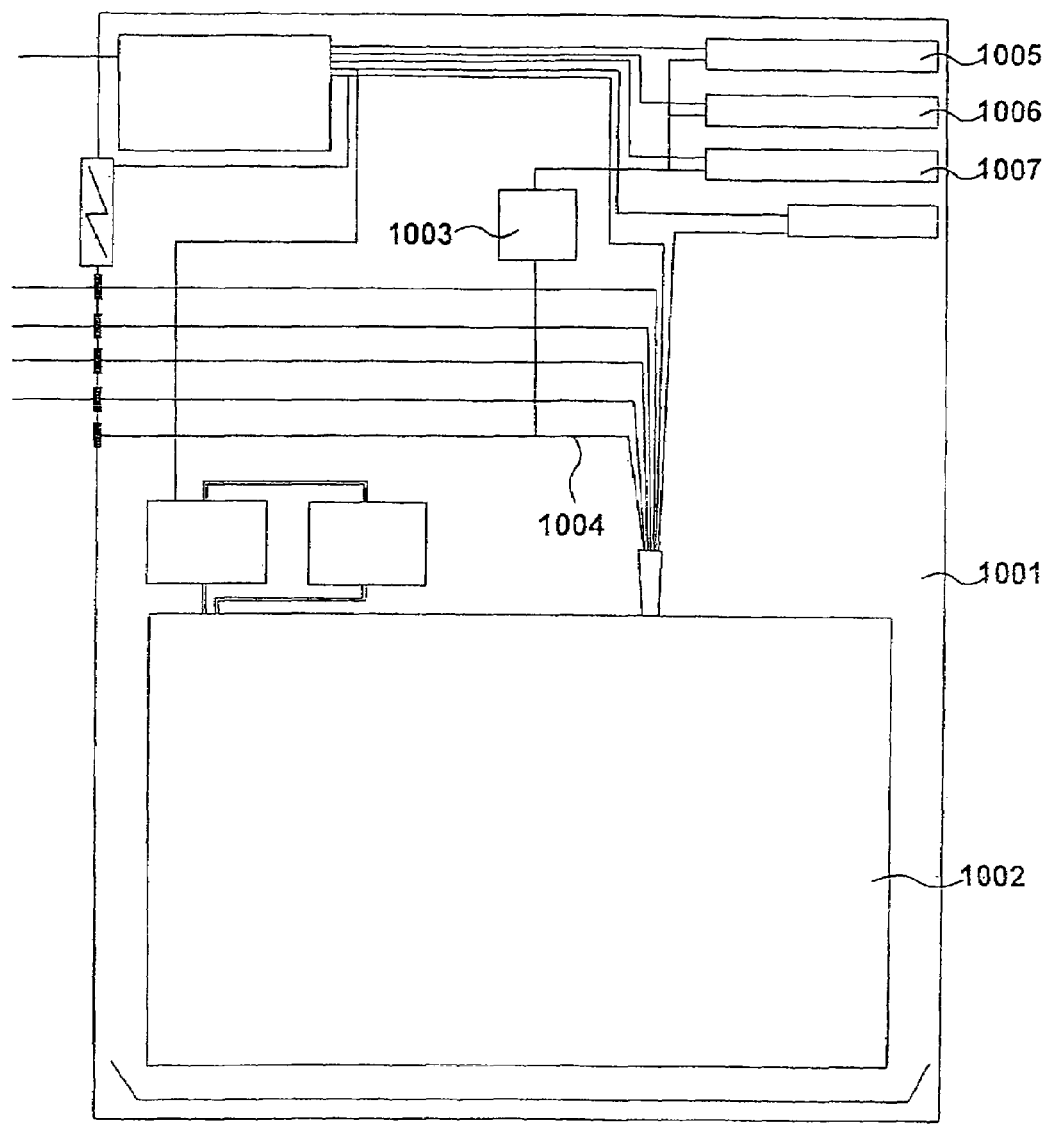
FIG. 10 shows a second embodiment of the invention.

FIG. 10 shows a second embodiment of the invention. Computer 1001 is substantially identical to computer 101, and includes a motherboard unit 1002. It additionally includes an IDE replicator 1003 connected to USB cable 1004. Hard drive 1005, CD-ROM drive 1006 and DVD drive 1007 all have IDE interfaces and are controlled by the motherboard unit via USB cable 1004 and IDE replicator 1003.

Thus in this embodiment communication between the motherboard and the drives is still serial, but is via a Universal Serial Bus cable rather than a serial ATA cable.

Figure 11:
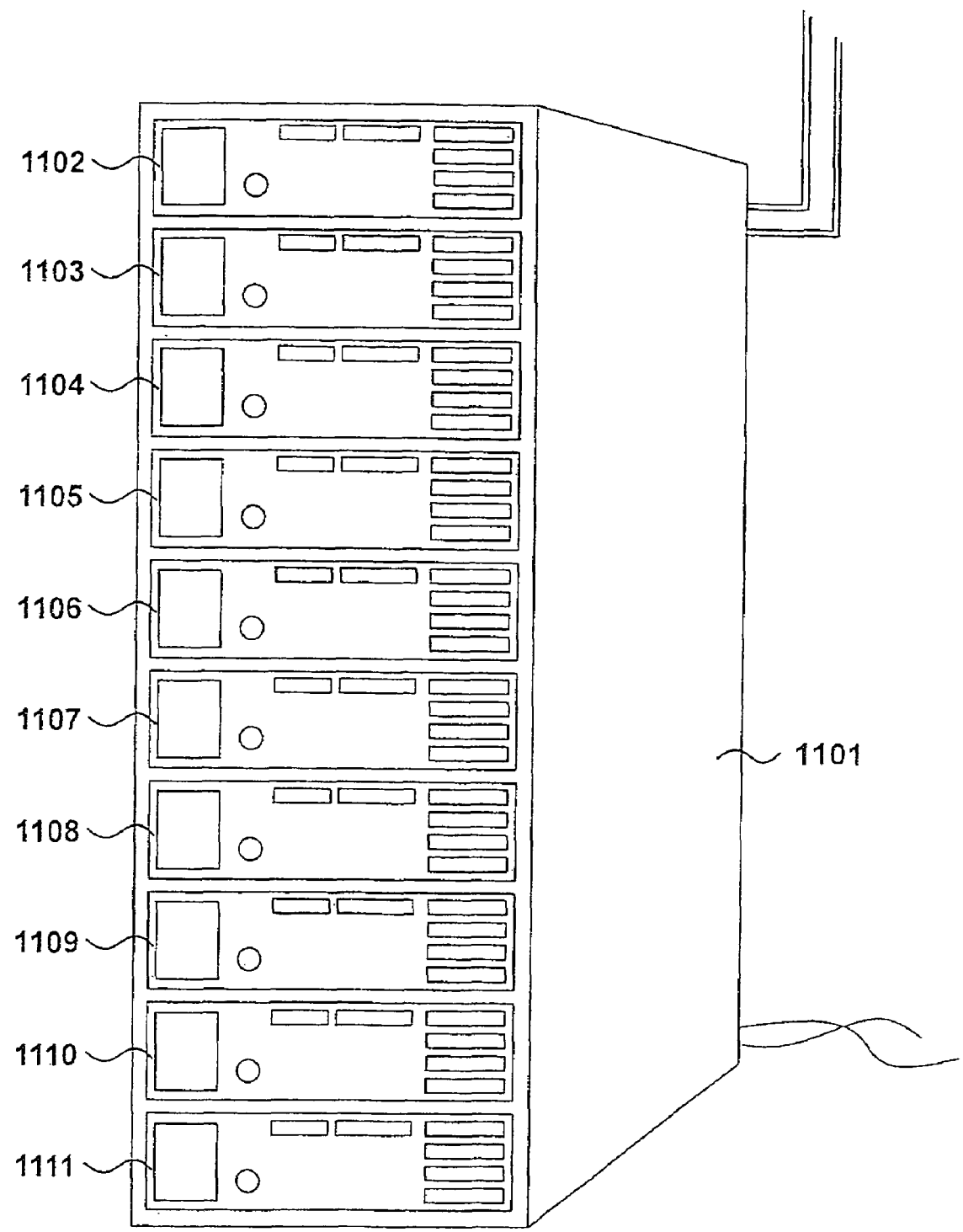
FIG. 11 illustrates a server farm as a third embodiment of the invention.

FIG. 11 illustrates a third embodiment of the invention. A server rack 1101 holds a plurality of servers 1102, 1103, 1104, 1105, 1106, 1107, 1108, 1109, 1110 and 1111. None of these servers is attached to a monitor, a keyboard, or a mouse. Each is connected to a network and serves data to users of computers on this network.

A server farm such as that shown in FIG. 11 is typically used in applications such as web servers, image data processing, and scientific data processing. Because each server, such as server 1102, produces a large amount of heat, traditional server farms need a high quality air-conditioning system to avoid overheating. A typical computer is cooled by drawing air in from its environment, and if this air is too hot the computer can overheat. However, each of the computers shown in FIG. 11 is cooled internally, thus avoiding the need for an air conditioning system.

Figure 12:
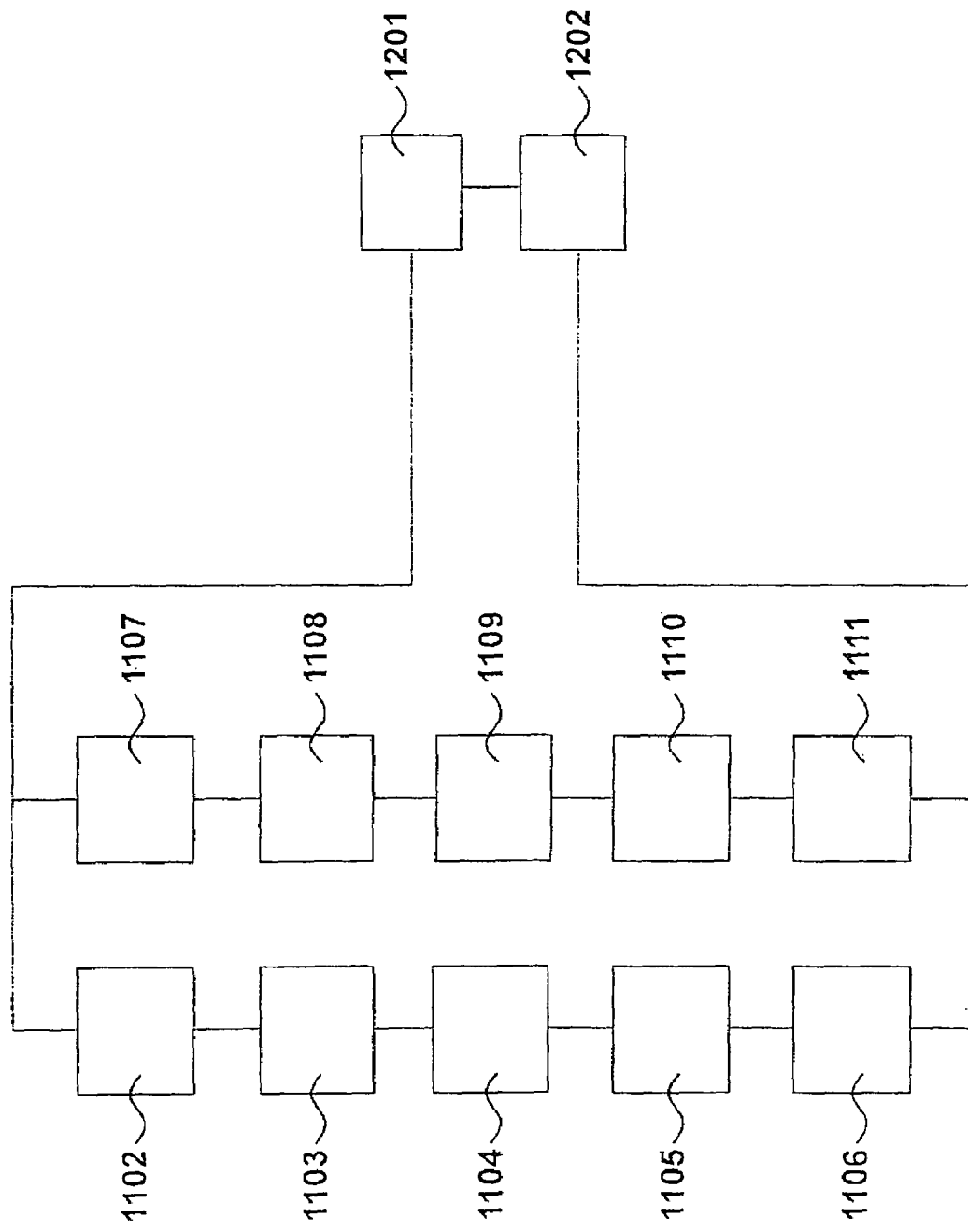
FIG. 12 shows a diagram of the cooling system of the server farm shown in FIG. 11.

FIG. 12 shows the server farm shown in FIG. 11 diagrammatically. A pump 1201 is connected to a condenser 1202, and computers 1102 to 1111 are connected in a "daisy chain"

manner. Each of the computers 1102 to 1111 contains a motherboard unit similar to motherboard unit 211 and the coolant is pumped round each of the computers before being condensed in condenser 1202. This system is far more efficient than air conditioning the room in which the server farm is kept, because it is not subject to external factors such as heat coming through the walls, through an open door or from people in the room.

Figure 13:
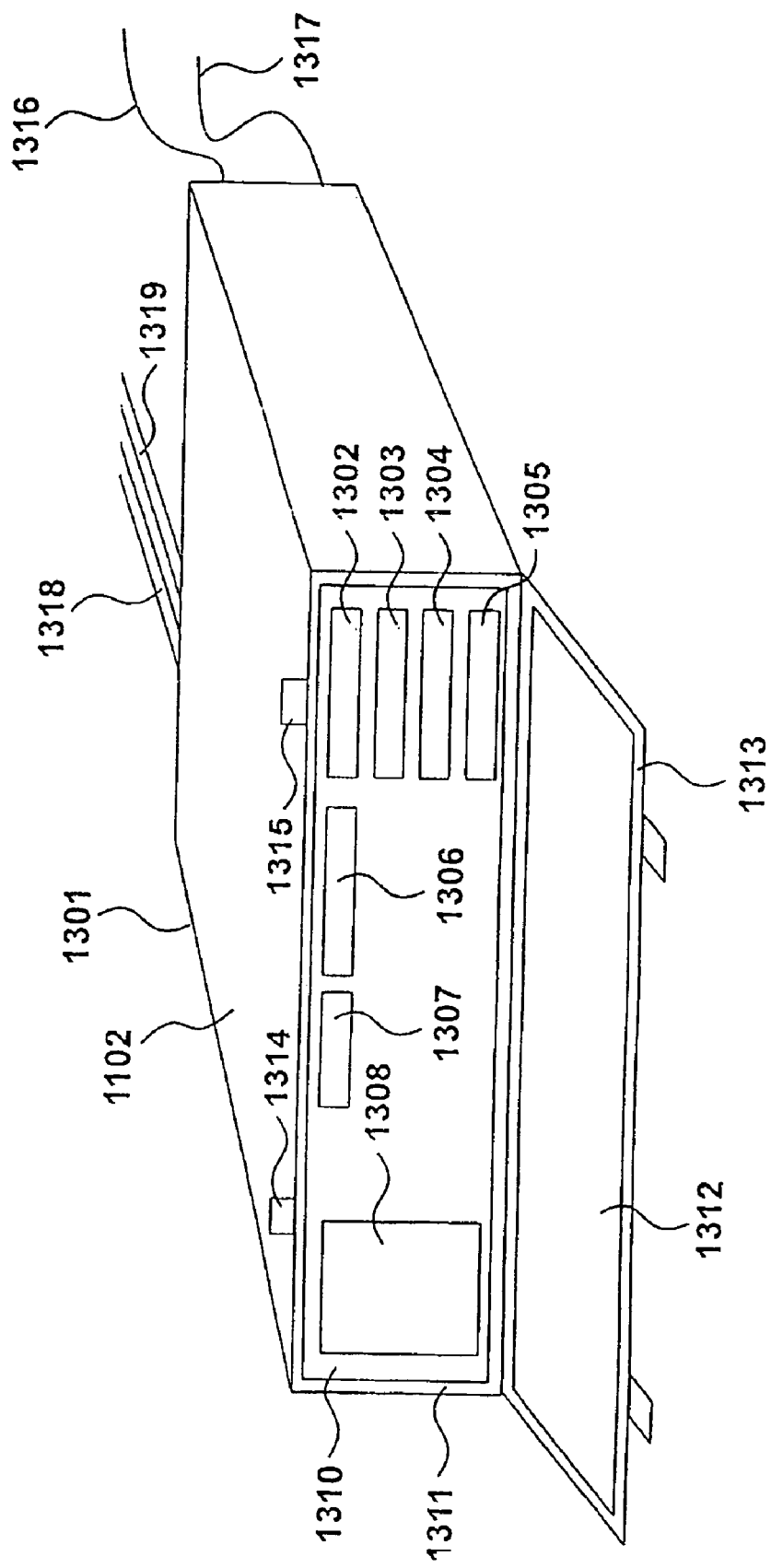
FIG. 13 illustrates a server shown in FIG. 11.

FIG. 13 shows computer 1102. It comprises a case 1301 and four hard drives 1302, 1303, 1304 and 1305. A CD ROM drive 1306 and a floppy drive 1307 are also provided, while a display 1308 indicates the status of the computer.

Components 1302 to 1309 are housed within a fascia 1310, which is bordered by a rubber seal 1311.

Case 1301 has a door 1312 hinged at the bottom front of the case, which is also provided with a rubber seal 1313 on the inside. The door 1312 is made of glass or plastic in order that display 1308 can be seen when the case is shut. When door 1312 is closed the rubber seals 1311 and 1313 mate with each other, and the fastening of door 1312 using catches, such as catches 1314 and 1315, ensures that case 1301 is substantially airtight.

Server 1102 receives power via power supply 1316 and is connected to the network via cable 1317. Pipes 1318 and 1319 carry coolant to and from pump 1201 and condenser 1202.

Figure 14:
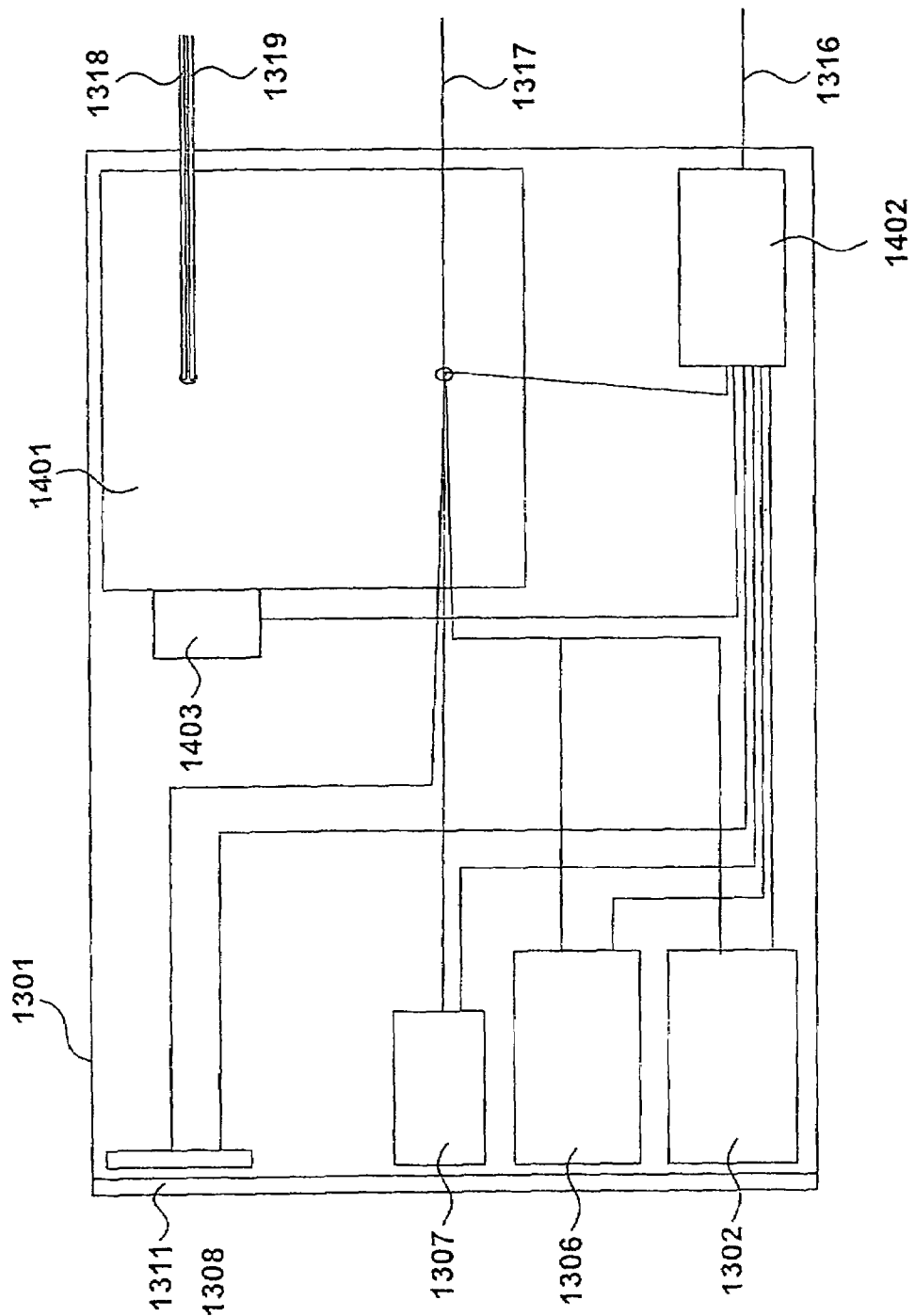
FIG. 14 shows a diagram of the server shown in FIG. 13.

FIG. 14 is a diagram of the interior of computer 1102 seen from above. Server 1102 includes a motherboard unit 1401 substantially similar to motherboard unit 211. It additionally includes a SATA RAID controller to control the four hard drives 1302 to 1305. Pipes 1318 and 1319 carry the coolant that cools the oil within motherboard unit 1401. Cables from drives 1302 to 1307, display 1308, network cable 1317, and power supply 1402, which receives power via cable 1316, enter motherboard unit 1401 through an aperture in the lid similar to aperture 311 in container 301.

Unlike computer 101, server 1102 does not include a fan in the case. Instead it is cooled using cooling unit 1403 which is attached to motherboard unit 1401. The air within case 1301 is heated up by components 1302 to 1308. This heat is transferred by cooling unit 1403 to the motherboard unit 1401, where it heats up the oil which is cooled by an evaporator coil similar to coil 314. This requires pump 1201 to use more power than it would have to were cooling units not present in the servers, but since this method keeps the servers at a temperature not significantly above room temperature the server farm does not require an air conditioning unit, and thus power is saved.

A further advantage of cooling unit 1403 is that it allows server 1102 to be airtight. A major cause of computer malfunction is particles in the air being sucked into the case by the fan and interfering with the operation of moving or electrical parts. This is a particular problem in manufacturing environments, where computers are often used to control industrial processes. However, server 1102 is sealed and is therefore not affected by airborne particles or other pollution. Thus, a standalone computer could use a cooling unit in a similar way to computer 1102, with a pump and evaporator either inside the case, as with computer 101, or outside the case, as in FIG. 13.

Figure 15:
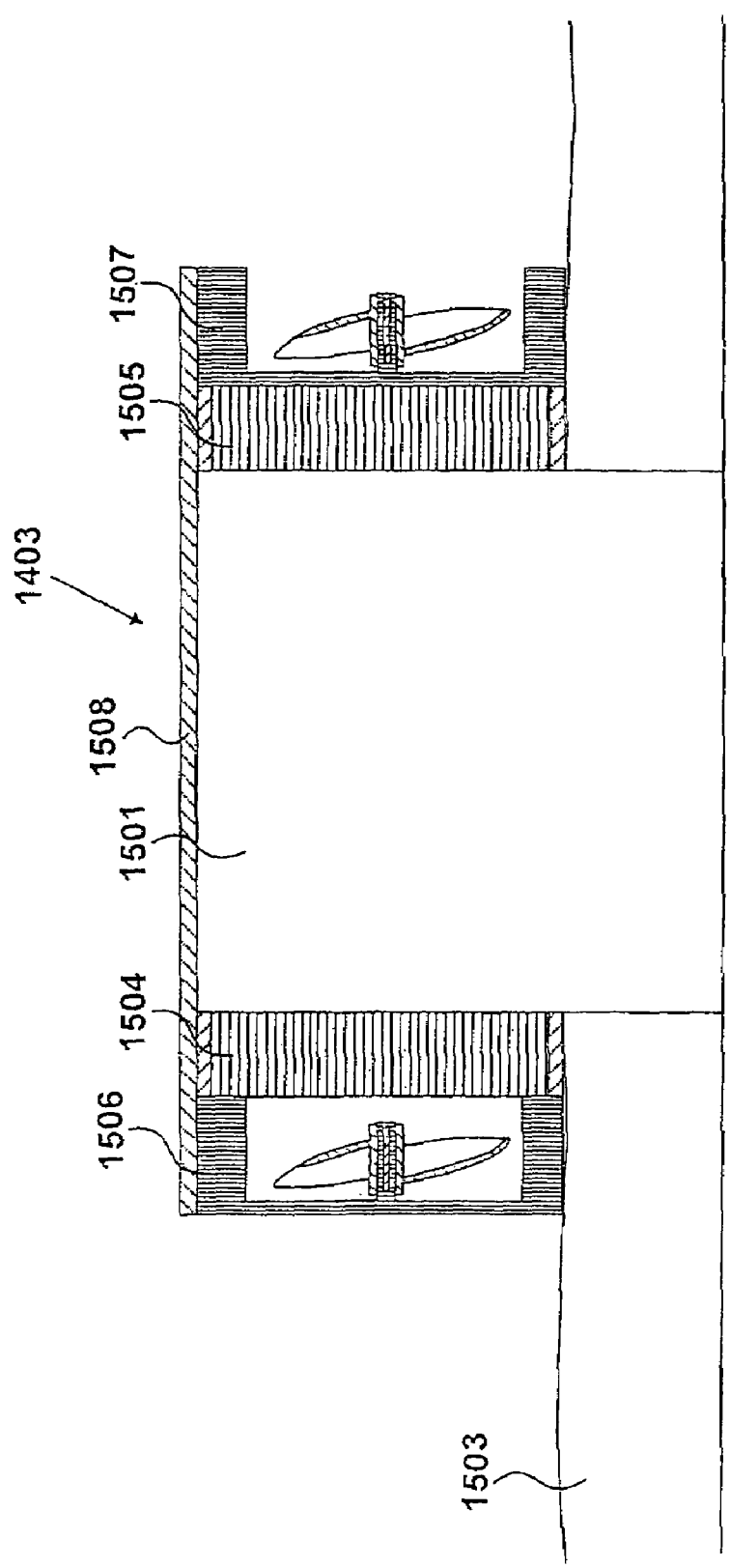
FIG. 15 shows a cross-section of a cooling unit shown in FIG. 14.

FIG. 15 shows a cross section through cooling unit 1403, seen from the top. It consists of a heat sink 1501 adjacent to the container 1502 of motherboard unit 1401. Insulating material 1503 surrounds it. Desiccating cartridges 1504 and 1505 are placed one on either side of the heat sink, on top of insulating material 1503. Fans 1506 and 1507 are placed adjacent to the desiccating cartridges. The cooling unit is encased on three sides by a sheath 1508, the open side being that adjacent the motherboard unit 1401.

Figure 16:
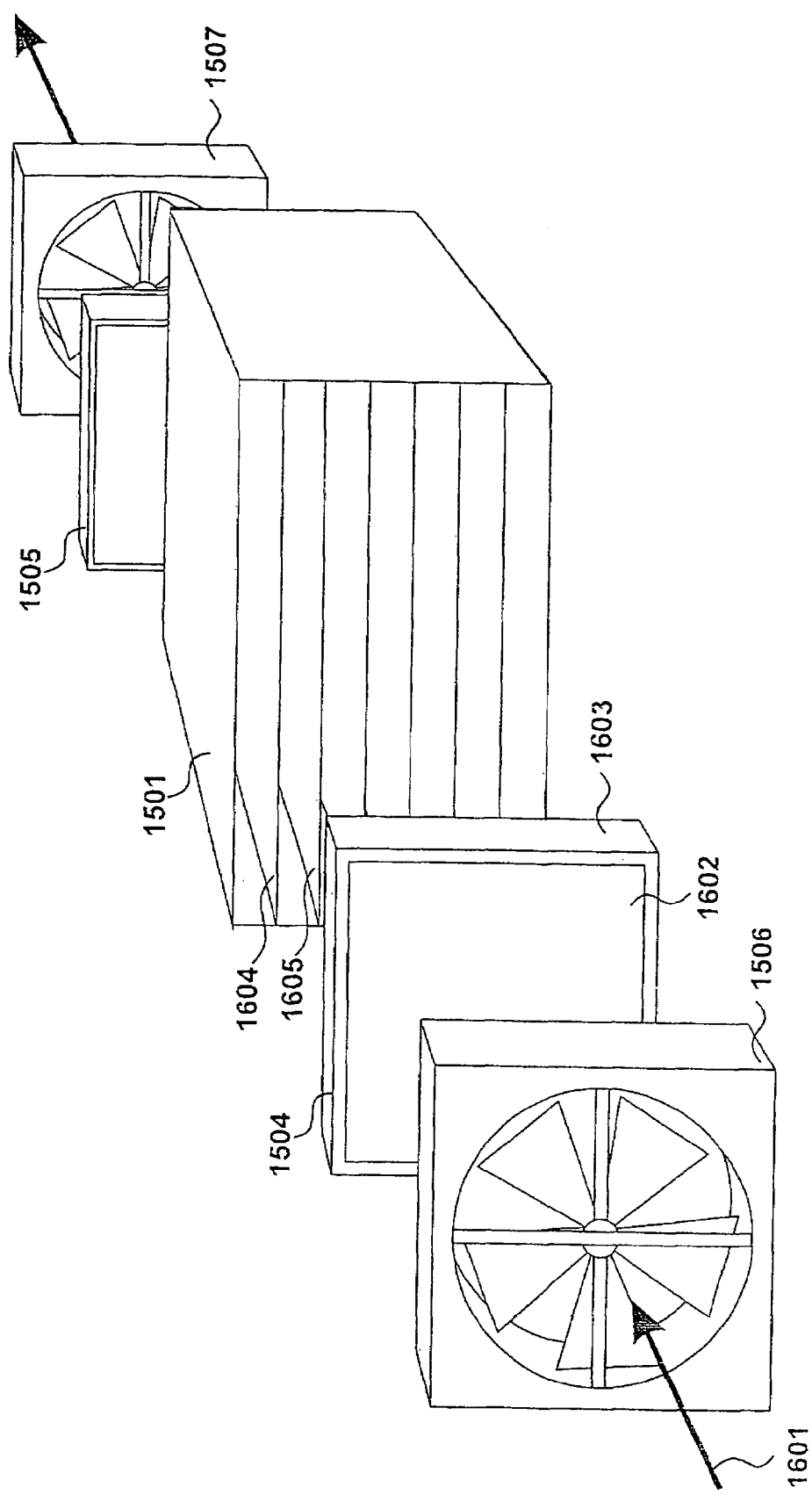
FIG. 16 is an exploded drawing of the cooling unit shown in FIGS. 14 and 15.

The operation of cooling unit 1403 is illustrated in FIG. 16, which is an exploded diagram of cooling unit 1402 without the sheath 1508. Air is sucked into the unit by fan 1506, as indicated by arrow 1601. It then passes through desiccating cartridge 1504, which is a sheet of desiccating material 1602 surrounded by a plastic sheath 1603. The air then passes through heat sink 1501, which has horizontal fins such as fins 1604 and 1605. Because the heat sink 1501 is in contact with the cold container of motherboard unit 1401, it transfers heat in the air to the container. The air then passes through desiccating cartridge 1505 and is blown out by fan 1507.

Other arrangements of cooling unit for cooling the air within case 1301 using motherboard unit 1401 are possible. In particular, cooling unit 1403 could have only one fan, a peltier element could be used, and so on.

Further embodiments of the invention are contemplated. For example, it may in the future be possible to immerse more components, such as the hard drive or power supply, into oil. In that event, a computer that does not require input from a CD-ROM or floppy drive could be cooled entirely by oil, with the motherboard unit and cooling system comprising the entire computer. Communication between the motherboard and the hard drives would still be serial. In addition, a different suitable fluid could be used instead of oil.

The invention claimed is:

1. In a computer system in which a central processing unit generates heat while in operation, said processing unit is mounted on a motherboard and said processing unit communicates with a storage device, an apparatus for cooling said motherboard, comprising:
    a substantially airtight container comprising a lid, the container being configured to enclose said motherboard, the motherboard being suspended from the lid so as to avoid contact with the sides of the container;
    a liquid contained within said container and surrounding said motherboard such that said motherboard is immersed in said liquid so as to remove heat from said processing unit;
    a cooling system configured to cool the interior of the container; and
    a serial data connection extending from said container to provide serial communication between said processing unit and said storage device.

2. The apparatus according to claim 1, wherein said substantially airtight container has an opening that is closed by the application of the lid, each provided with a lip such that a seal is formed when said lips are brought into contact.

3. The apparatus according to claim 1, wherein said liquid is oil.

4. The apparatus according to claim 1, wherein said cooling system comprises an evaporator coil within the liquid, a pump connected to said coil by pipes and a condenser connected to the pump and the coil by pipes, wherein said cooling system includes a coolant to provide a working fluid.

5. The apparatus according to claim 1, including a peltier element in thermal contact with the processing unit.

6. The apparatus according to claim 5, wherein a heatsink is in thermal contact with the peltier element.

7. The apparatus according to claim 1, including an agitator arranged to agitate the liquid contained within the container.

8. The apparatus according to claim 1, wherein a desiccant material is contained within the container.

9. A computer system, comprising:
    a motherboard having at least one processing unit mounted thereon that generates heat while in operation;

at least one storage device separate from said motherboard;

a substantially airtight container, comprising a lid, the container containing a liquid into which said motherboard is immersed so as to remove heat from said motherboard, and the motherboard being suspended from the lid so as to avoid contact with the sides of the container;

a serial communication cable extending through an airtight hole in said container to provide serial communication between said processing unit and said storage device; and a cooling system configured to cool the interior of the container; and a serial data connection extending from said container to provide serial communication between said processing unit and said storage device.

10. The computer system according to claim 9, wherein the container is surrounded by insulating material to prevent heat taken outside the container from re-entering the container.

11. The computer system according to claim 10, in which the insulated container and the data storage device are housed in a case and a second cooling unit is provided for removing heat from said container.

12. A method of cooling heat generating electrical components arranged on a board, comprising the steps of:

forming a substantially airtight container with a lid, said lid being removed;

connecting said board via a serial cable to an external storage device via a substantially airtight hole in said container;

pouring a liquid into the container such that the board is immersed in said liquid when the board is inserted into the container;

placing a cooling system inside said container so as to remove heat from the inside of said container;

suspending the board from the lid such that when the lid is applied, the board will avoid contact with the sides of the container;

applying said substantially airtight lid, such that the board is inserted into the container; and activating said cooling system.

13. The method according to claim 12 wherein a substantial proportion of said heat is generated by one or more integrated processing units.

14. The method according to claim 13, wherein said processing units have a recommended clock speed for operation in ambient conditions, wherein said processing units are arranged to operate at a faster clock speed than the recommended clock speed.

15. The method according to claim 13, wherein additional cooling devices are applied directly to said processing units in the container.

16. The method according to claim 12, wherein the liquid in the container is agitated.

17. The method according to claim 12, wherein insulation is applied to the outside of said container.

18. The method according to claim 17, wherein the insulated container and the storage device are placed in a case and an additional cooling system is arranged to remove heat from said case.

* * * * *